US009349518B2

(12) United States Patent
Wu et al.

(10) Patent No.: US 9,349,518 B2
(45) Date of Patent: May 24, 2016

(54) CABLE CONNECTOR ASSEMBLY

(71) Applicant: HON HAI PRECISION INDUSTRY CO., LTD., New Taipei (TW)

(72) Inventors: Jerry Wu, Irvine, CA (US); Jun Chen, Kunshan (CN); Fan-Bo Meng, Kunshan (CN)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 11 days.

(21) Appl. No.: 14/287,653

(22) Filed: May 27, 2014

(65) Prior Publication Data

US 2014/0345937 A1 Nov. 27, 2014

(30) Foreign Application Priority Data

May 24, 2013 (CN) .......................... 2013 1 0197476

(51) Int. Cl.
*H02G 15/18* (2006.01)
*H01F 17/06* (2006.01)

(52) U.S. Cl.
CPC .......... *H01F 17/06* (2013.01); *H01F 2017/065* (2013.01)

(58) Field of Classification Search
CPC ..................... H03H 2001/0028; H02G 15/113
USPC .................................. 174/92; 336/92; 333/12
See application file for complete search history.

(56) References Cited

U.S. PATENT DOCUMENTS

| | | | | | |
|---|---|---|---|---|---|
| 5,900,796 | A | 5/1999 | Parker | | |
| 6,023,023 | A * | 2/2000 | Takeuchi | H03H 1/0007 | 174/92 |
| 6,160,466 | A * | 12/2000 | Kawai | H01F 17/06 | 336/176 |
| 7,550,670 | B2 * | 6/2009 | Kuo | H01R 13/719 | 174/74 R |
| 7,669,294 | B2 | 3/2010 | Campbell | | |
| 2011/0031006 | A1 | 2/2011 | Chen et al. | | |

FOREIGN PATENT DOCUMENTS

| | | |
|---|---|---|
| CN | 1320984 A | 11/2001 |
| CN | 1095586 | 12/2002 |
| CN | 201576906 U | 9/2010 |

* cited by examiner

*Primary Examiner* — Chau N Nguyen

(74) *Attorney, Agent, or Firm* — Ming Chieh Chang; Wei Te Chung

(57) ABSTRACT

A cable connector assembly (100) includes a connector (1), a cable (2) connected to the connector, a magnetic element (3) encircling the cable, and a housing (4) covering the magnetic element. The housing includes a front wall (40) adjacent to the connector, a rear wall (41) away from the connector, and a side wall (42) with closed periphery connecting the front and the rear wall, a receiving space (43) defined in the housing and running through the front and the rear wall to form a first hole (401) on the center of the front wall and a second hole (411) on the center of the rear wall. The housing includes a first projection (44) between the first hole and an outer edge of the front wall to weaken the concentrated stress generated by the cable wound on the housing.

14 Claims, 6 Drawing Sheets

CABLE CONNECTOR ASSEMBLY

BACKGROUND OF THE INVENTION

1. Field of the Invention

The present invention relates to a cable connector assembly, and more particularly to a cable connector assembly having a magnetic element and a housing for covering the magnetic element.

2. Description of Related Arts

China Patent No. 1095586, issued on Dec. 4, 2002, discloses a product of a magnetic core with the function of filtering for a cable and its manufacturing method. The magnetic core is cylindrical and is preset at an appropriate position of the cable, and then the cable winds around the magnetic core and exposes a part thereof outside of the magnetic core.

U.S. Patent Application Publication No. 2011/0031006, published on Feb. 10, 2011, discloses a cable assembly having a cable holder for anti-EMI function. The cable assembly comprises a cable, a filter made of magnetic material for anti-EMI and surrounding the cable, an insulative main body enclosing the filter, at least one pair of flexible prongs extending outwardly from the insulative main body to form a clip, the clip having a hole for receiving the cable. The clip provided at outside of the insulative main body results in extra space required to accommodate the cable assembly.

U.S. Pat. No. 7,669,294, issued on Mar. 2, 2010, discloses a cable termination having an anchor. The anchor has a circular expansion extending around to outside. Such an expansion extends the bending shoulder so that a cable can be bent all the way around the anchor up to 180 degrees. If the shoulder is carried over the top of the anchor, the bending angle could even exceed 180 degrees. However, the cable may move around the anchor and become loose.

An improved cable connector assembly is desired to offer advantages over the related art.

SUMMARY OF THE INVENTION

An object of the present invention is to provide a cable connector assembly with the function of anti-EMI and arranging the cable.

To achieve the above-mentioned object, a cable connector assembly comprising: a connector; a cable connected to the connector; a magnetic element encircling the cable; and a housing covering the magnetic element, the housing comprising a front wall, a rear wall, and a closed peripheral side wall connecting the front and the rear walls, the housing having a receiving space running through the front wall to form a first central hole and through and the rear wall to form a second central hole, the housing comprising a first projection between the first hole and an outer edge of the front wall, the first projection has a middle part recessed inwardly to form a first recess.

According to the present invention, the housing comprises a first projection on the front wall of the housing. Therefore, the cable passing out of the first hole can go around the first projection that reduce the concentrated stress generated by the cable when the cable wound on the housing.

DETAILED DESCRIPTION OF THE PREFERRED EMBODIMENT

Reference will now be made in detail to a preferred embodiment of the present invention.

Figure 1:
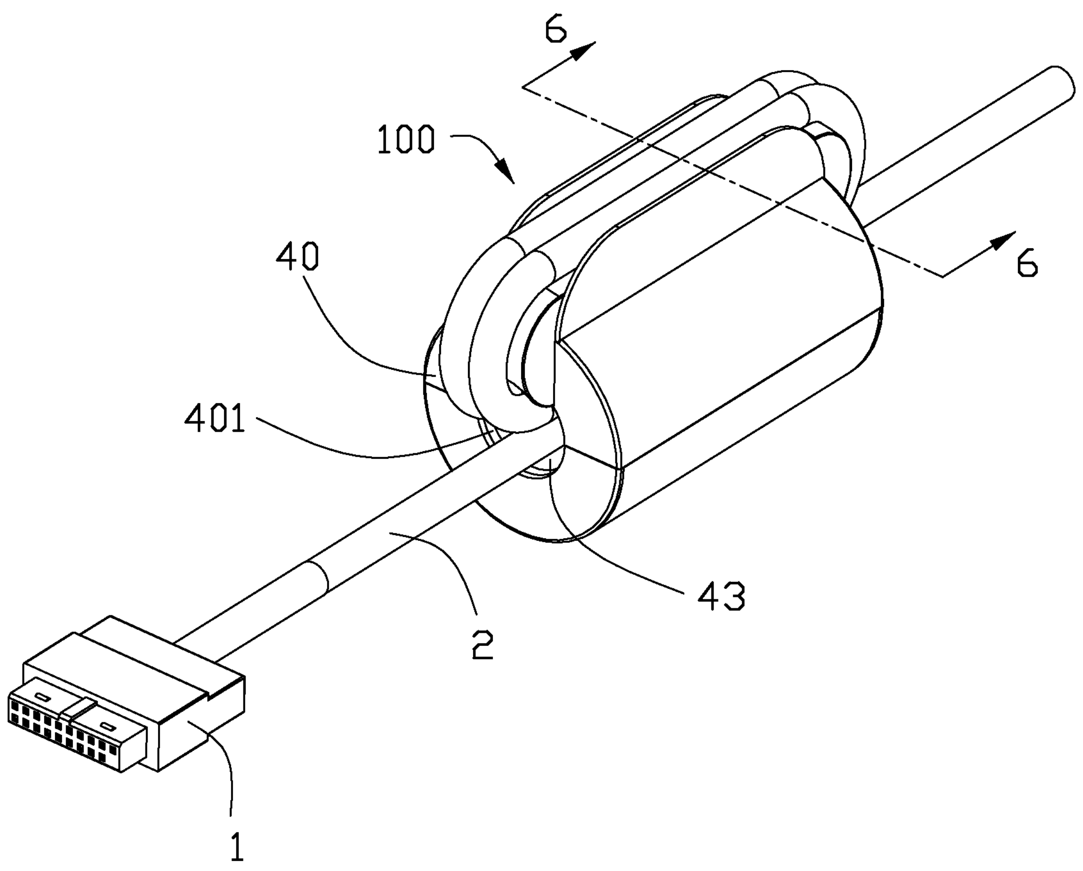
FIG. 1 is a perspective view of a cable connector assembly in accordance with the present invention.
Figure 2:
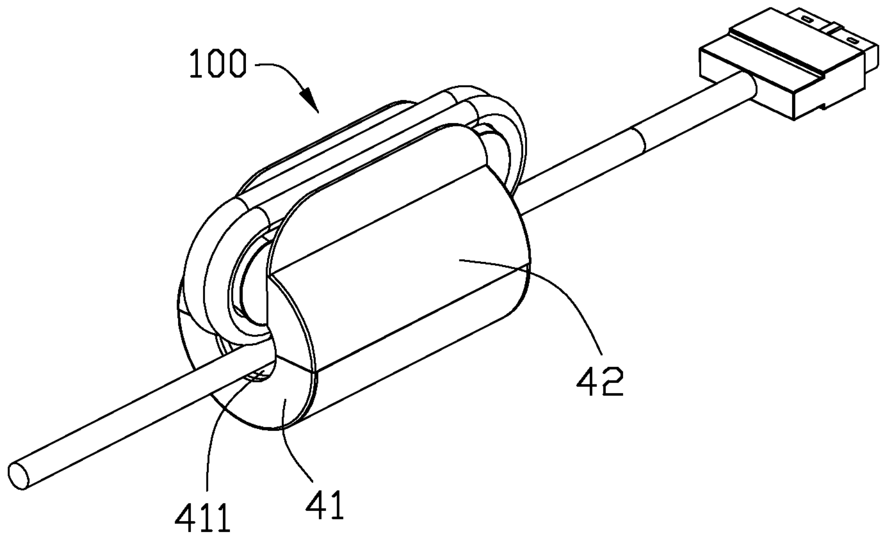
FIG. 2 is another perspective view of the cable connector assembly as shown in FIG. 1.
Figure 3:
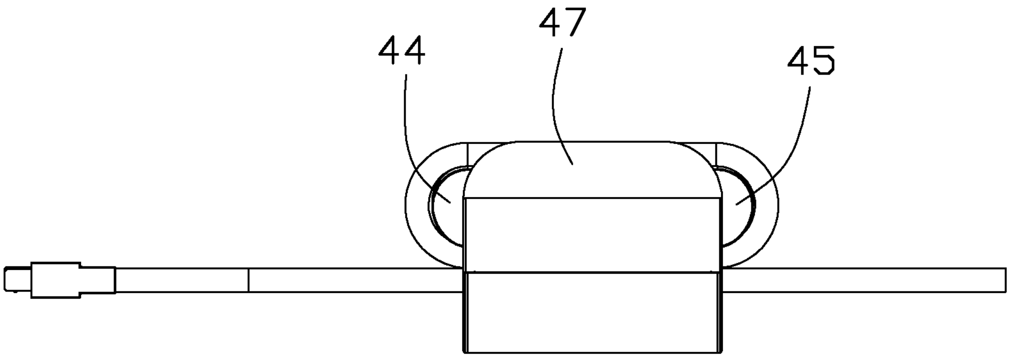
FIG. 3 is another perspective view of the cable connector assembly as shown in FIG. 1.

Referring to FIGS. 1 to 3, a cable connector assembly 100 comprises a connector 1, a cable 2 connected to the connector 1, a magnetic element 3 encircling the cable 2, and a housing 4 covering the magnetic element 3.

The magnetic element 3 is cylindrical. The magnetic element 3 comprises a through hole 30 for the cable 2 passing through.

The housing 4 comprising a front wall 40 adjacent to the connector 1, a rear wall 41 away from the connector 2, and a side wall 42 with closed periphery connecting the front wall 40 and the rear wall 41, a receiving space 43 defined in the housing 4 and running through the front wall 40 and the rear wall 41 to form a first hole 401 on the center of the front wall 40 and a second hole 411 on the center of the rear wall 41. The magnetic element 3 is set in the receiving space 43.

Figure 4:
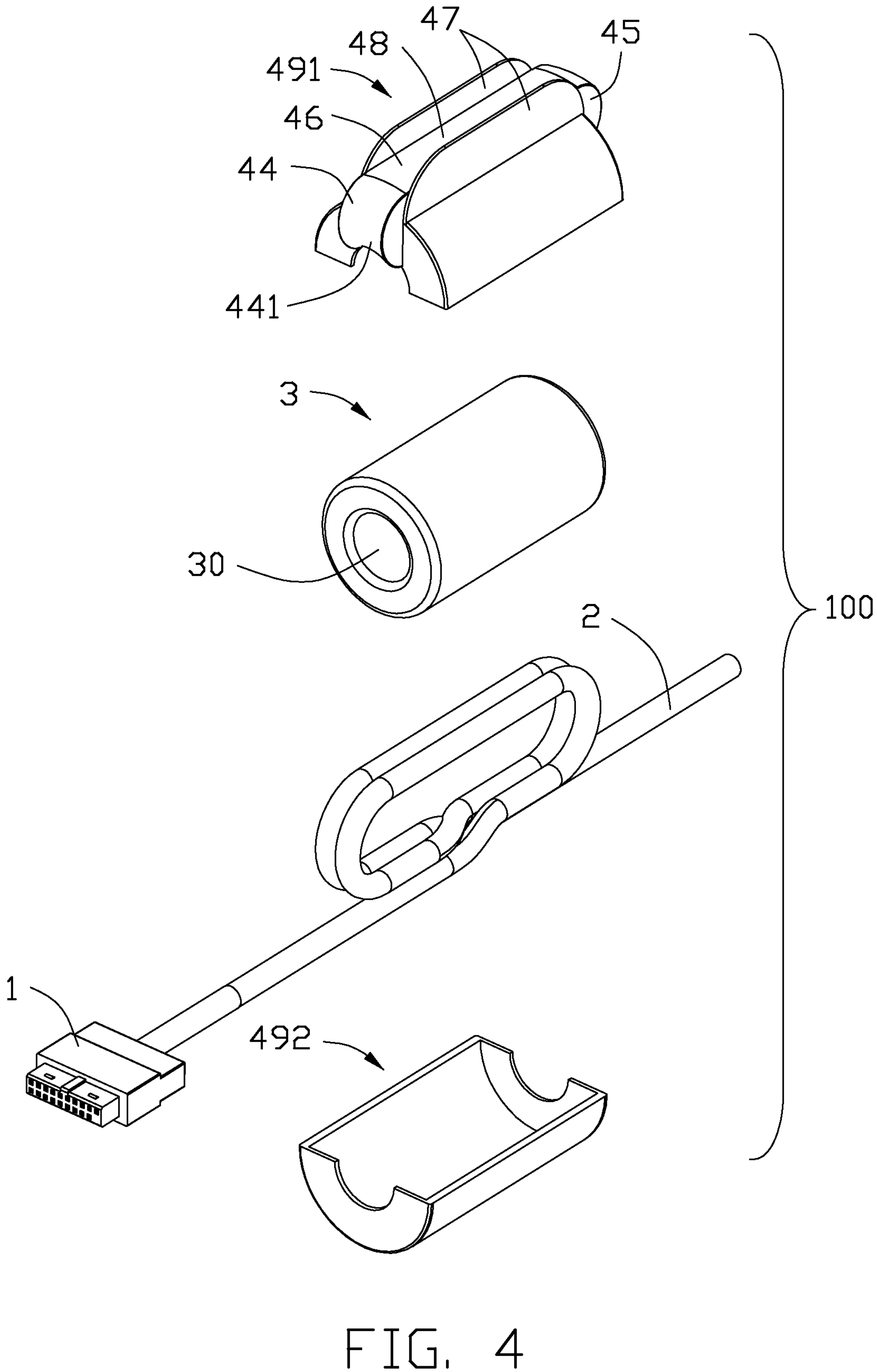
FIG. 4 is a partly exploded view of the cable connector assembly as shown in FIG. 1.
Figure 5:
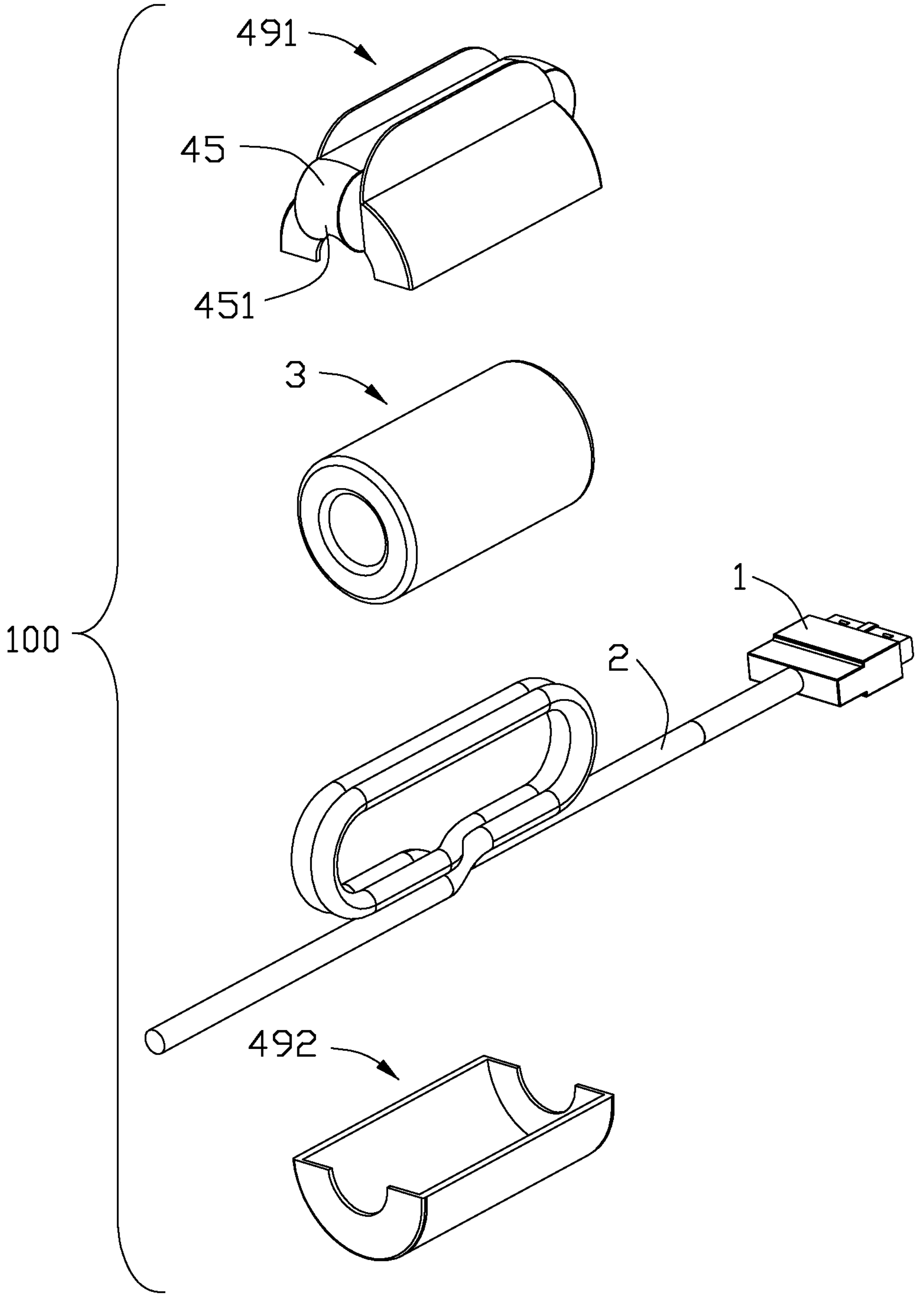
FIG. 5 is another partly exploded view of the cable connector assembly as shown in FIG. 1.

Referring to FIGS. 4 and 5, the housing 4 comprises a first projection 44 between the first hole 401 and an outer edge of the front wall 40 to weaken the concentrated stress generated by the cable 2 wound on the housing 4, and a second projection 45 is formed from the second hole 411 to an outer edge of the rear wall 41 to weaken the concentrated stress generated by the cable 2 wound on the housing 4. The first projection 44 is arranged symmetrically to the second projection 45. When the first projection 44 is provided on a place of the front wall 40, the second projection 45 is provided on the same place of the rear wall 41. Both of the first projection 44 and the second projection 45 comprise curved surfaces in order to make the cable 2 be wound along the curved surfaces.

A middle part of the first projection 44 recessing inwardly forms a first recess 441, and a middle part of the second projection 45 also recessing inwardly forms a second recess 451, then the cable will concentrate on the first recess 441 and the second recess 451 when wound to the housing 4. The first projection 44 extends from the first hole 401 toward and beyond the outer edge of the front wall 40, and the second projection 45 extends from the second hole 411 toward and beyond the outer edge of the rear wall 41. The side wall 42 of the housing 4 comprises a ledge 46 connecting a portion of the first projection 44 beyond the outer edge of the front wall 40 and a portion of the second projection 45 beyond the outer edge of the rear wall 41. The side wall 42 of the housing 4 comprises a pair of tabs 47 extending upwardly from opposite sides of the ledge 46, and the tabs 47 and the ledge 46 cooperates to form a groove 48 for receiving the cable 2. The groove 48 can prevent the cable 2 from dropping down from the ledge 46 and loosing.

Figure 6:
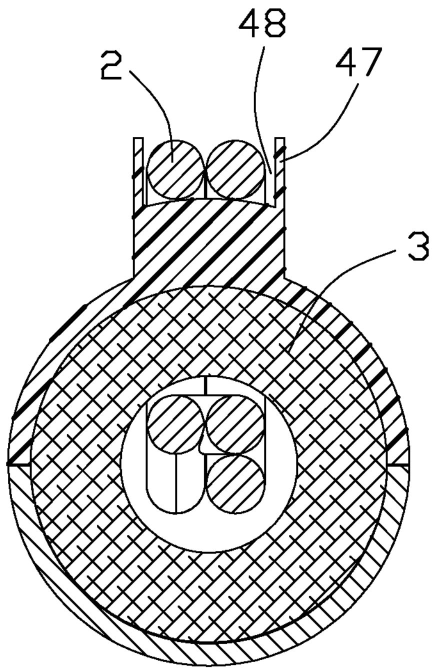
FIG. 6 is a cross-sectional view of the cable connector assembly taken along line 6-6 of FIG. 1.

The housing 4 comprises a first housing 491 and a second housing 492 which is corresponding to the first housing 491. The width of the ledge 46 is larger than or equal to a diameter of the cable 2. Referring to FIG. 6, the height of the tabs 47 is larger than or equal to the diameter of the cable 2. All of the tabs 47, the first projection 44, the second projection 45 and the ledge 46 are molded on the housing 4. The diameter of the trough hole 30 is larger than or equal to the diameter of the first hole 401 or the second hole 411.

When assembling the cable connector assembly 100, connect the cable 2 to the connector 1 firstly. The first housing 491 and the second housing 492 are cooperating to enclose the magnetic element 3. In other embodiment, the housing 4 also can be molded around the magnetic element 3. The magnetic element 3 and the housing 4 are located on the right position of the cable 2 which is near the connector 1 with the function of filtering. The cable 2 enters the through hole 30 from one side and comes out from another side of the through hole 30, then the cable 2 winds around the side wall 42 of the housing 4 along the second projection 45 and concentrates in the recess 48, and then the cable 2 goes along the first projection 44 and across the through hole 30 again by the same way. So the cable 2 winds around the housing 4 about twice along the axial direction of the magnetic element 3.

In this embodiment, the cable 2 winds around the housing 4 about twice, and in the other embodiment, the cable 2 can winds around the housing 4 once or more. The cable 2 winding around the first projection 44 and the second projection 45 can reduce the concentrated stress so that the cable 2 may not easy to be damaged by hard folding.

It is to be understood, however, that even though numerous characteristics and advanarmes of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A cable connector assembly comprising:

a connector;

a cable connected to the connector;

a magnetic element encircling the cable; and a housing covering the magnetic element, the housing comprising a front wall, a rear wall, and a closed peripheral side wall connecting the front and the rear walls, the housing having a receiving space running through the front wall to form a first central hole and through the rear wall to form a second central hole, the housing comprising a first projection between the first hole and an outer edge of the front wall, the first projection having a middle part recessed inwardly to form a first recess;

wherein the housing has a second projection formed between the second hole and an outer edge of the rear wall;

wherein the first projection is arranged symmetrically to the second projection;

wherein each of the first and the second projections comprises a curved surface;

wherein the second projection has a middle part recessed inwardly to form a second recess;

wherein the first projection extends from the first hole toward and beyond the outer edge of the front wall, and the second projection extends from the second hole toward and beyond the outer edge of the rear wall; and wherein the side wall of the housing comprises a ledge connecting a portion of the first projection beyond the outer edge of the front wall and a portion of the second projection beyond the outer edge of the rear wall.

2. The cable connector assembly as recited in claim 1, wherein the side wall of the housing comprises a pair of tabs extending upwardly from opposite sides of the ledge, and the tabs and the ledge cooperate to form a groove for receiving the cable.

3. The cable connector assembly as recited in claim 1, wherein the width of the ledge is equal to or greater than a diameter of the cable.

4. A cable connector assembly comprising:

an electrical connector;

an electrical cable connected to the electrical connector;

a magnetic ring extending along an axial direction with a distance with a center through hole along said axial direction;

a housing enclosing said magnetic ring with two opposite end holes at two opposite end walls in aligned with the center through hole along said axial direction, and the cable extending through said two opposite end holes and said center through hole with at least one loop having an internal part extending through the through hole and an external part wound on an exterior surface of the housing and a pair of bending parts linked therebetween around two opposite end walls; wherein a pair of bulged sections are formed on and protrude beyond said two opposite end walls intimately beside the corresponding end holes in a radial direction, and each of said bulged sections defines an arc structure against which the corresponding bending parts of the loop is supportably wound.

5. The cable connector assembly as claimed in claim 4, wherein said bulged section defines along said radial direction a first radial dimension which is larger than a second radial dimension measured between the corresponding end hole and a circumference of the end wall.

6. The cable connector assembly as claimed in claim 4, wherein said bulged section defines a recess in a cross-section taken along an intersection plane perpendicular to said radial direction so as to have the loop retained within the recess.

7. The cable connector assembly as claimed in claim 4, wherein a pair of tabs are formed on the exterior surface of the housing to form therebetwen a groove receiving said external part of the loop therein.

8. The cable connector assembly as claimed in claim 7, wherein said groove is connected to the corresponding bulged sections at two opposite ends so as to have the loop extend in a capsular configuration.

9. The cable connector assembly as claimed in claim 4, wherein said housing is assembled by two semicircular parts, and said radial direction is perpendicular to an interface plane of said two semicircular parts.

10. A cable connector assembly comprising:

an electrical connector;

an electrical cable connected to the electrical connector;

a magnetic ring extending along an axial direction with a distance with a center through hole along said axial direction;

a housing enclosing said magnetic ring with two opposite end holes at two opposite end walls in aligned with the center through hole along said axial direction, and the cable extending through said two opposite end holes and said center through hole with at least one loop having an internal part extending through the through hole and an external part wound on an exterior surface of the housing and a pair of bending parts linked therebetween around said two opposite end walls; wherein a combination of the housing and the magnetic ring commonly defines a cylindrical structure with said two opposite end holes and with a constant radial thickness measured between an inner diameter of the through hole and an outer diameter of the exterior surface except at a position in one specific radial direction where the loop is wounded, and the thickness at said position is larger than said constant radial thickness for providing a larger relief structure of the two opposite bending parts.

11. The cable connector assembly as claimed in claim 10, wherein a pair of tabs are formed on the exterior surface along said radial direction for protect said loop from sideward disturbing.

12. The cable connector assembly as claimed in claim 10, wherein the housing forms a pair of bulged sections at two opposite end wall at said position, and each of said bulged sections defines a dimension along said radial direction is similar to the thickness at said position.

13. The cable connector assembly as claimed in claim 12, wherein each bulged sections forms a recess in a cross-section taken along an intersecting plane perpendicular to said specific radial direction.

14. The cable connector assembly as claimed in claim 10, wherein said housing is assembled by two semicircular parts, and said specific radial direction is perpendicular to an interface plane of said two semicircular parts.

* * * * *